(12) United States Patent
Watanabe et al.

(10) Patent No.: US 8,559,066 B2
(45) Date of Patent: Oct. 15, 2013

(54) IMAGE-READER SELECTING PARAMETER

(75) Inventors: Toshihiro Watanabe, Kuwana (JP); Atsushi Yokochi, Chiryu (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 262 days.

(21) Appl. No.: 13/020,370

(22) Filed: Feb. 3, 2011

(65) Prior Publication Data
US 2011/0188091 A1 Aug. 4, 2011

(30) Foreign Application Priority Data
Feb. 3, 2010 (JP) ................................. 2010-022233

(51) Int. Cl.
*H04N 1/50* (2006.01)

(52) U.S. Cl.
USPC .......................................... 358/468; 358/400

(58) Field of Classification Search
USPC ........... 358/1.9, 2.1, 496, 498, 468, 500, 400, 358/504, 406
See application file for complete search history.

(56) References Cited

U.S. PATENT DOCUMENTS

| | | | | |
|---|---|---|---|---|
| 7,609,399 B2 * | 10/2009 | Tanaka | ......................... | 358/1.12 |
| 7,916,367 B2 * | 3/2011 | Dokuni | ......................... | 358/523 |
| 8,049,917 B2 * | 11/2011 | Noguchi et al. | ............. | 358/1.15 |
| 8,284,464 B2 * | 10/2012 | Nakashita | ..................... | 358/498 |
| 2006/0050291 A1 * | 3/2006 | Morikawa et al. | ........... | 358/1.13 |
| 2007/0183001 A1 * | 8/2007 | Koguchi | ....................... | 358/464 |
| 2008/0100881 A1 | 5/2008 | Yamada | | |

FOREIGN PATENT DOCUMENTS

| | | |
|---|---|---|
| JP | S63-026069 | 2/1988 |
| JP | H8-265576 | 10/1996 |
| JP | 11-308471 | 11/1999 |
| JP | 2001-8088 | 1/2001 |
| JP | 2007-081779 | 3/2007 |
| JP | 2007-274449 | 10/2007 |
| JP | 2008-118269 | 5/2008 |
| JP | 2009-212591 | 9/2009 |

OTHER PUBLICATIONS

Japanese Office Action dated Feb. 14, 2012 issued in Japanese Patent Application No. JP 2010-022233.

* cited by examiner

*Primary Examiner* — Thomas D Lee
*Assistant Examiner* — Stephen M Brinich
(74) *Attorney, Agent, or Firm* — Scully, Scott, Murphy & Presser, P.C.

(57) ABSTRACT

In the image-reader, a first reading unit generates the first surface worth of first image data by reading a first surface of an document sheet. The second reading unit generates the second surface worth of second image data by reading a second surface. The process surface determining unit determines which of the first surface and the second surface is a process surface. The parameter storing unit stores a first parameter that corresponds to the first surface and a second parameter that corresponds to the second surface. The selecting unit selects one of the first parameter and the second parameter as a process parameter that corresponds to the process surface. The selecting unit outputs the process parameter. The image process executing unit executes an image process on the one of the first image data and the second image data by using the process parameter.

6 Claims, 5 Drawing Sheets

Fig.4(a) BLOCK DIAGRAM OF ENLARGEMENT/REDUCTION PROCESS UNIT

Fig.4(b) METHOD FOR READING IMAGE WHEN DOUBLING SIZE OF ORIGINAL IMAGE

Fig.4(c) METHOD FOR READING IMAGE WHEN REDUCING ORIGINAL IMAGE TO ONE-THIRD SIZE

IMAGE-READER SELECTING PARAMETER

CROSS REFERENCE TO RELATED APPLICATION

This application claims priority from Japanese Patent Application No. 2010-022233 filed Feb. 3, 2010. The entire content of the priority application is incorporated herein by reference.

TECHNICAL FIELD

The invention relates to an image-reader having two image-reading sensors for simultaneously reading both sides of a document sheet.

BACKGROUND

A conventional image-reader known in the art is provided with two image-reading sensors disposed on a path along which a document sheet is conveyed. One image-reading sensor is provided for the front surface of the document sheet, and the other for the back surface of the document sheet, whereby the two image-reading sensors can simultaneously read both surfaces of a document sheet conveyed along the conveying path.

Japanese patent application publication No. H8-265576 describes an information processor having two image-reading sensors corresponding to both surfaces of a document sheet, and a single signal processing circuit. One image-reading sensor is provided for the front surface of the document sheet, and the other is provided for the back surface of the document sheet. Each of two image-reading sensors reads the document sheet in units of lines along a main scanning direction. Based on the parameters individually set for the two image-reading sensors, the signal processing circuit performs image processes on image signals received from the image-reading sensors, while alternating between the two image signals.

SUMMARY

In view of the foregoing, it is an object of the invention to provide an image-reader capable of quickly reading images from both surfaces of a plurality of document sheets using two image-reading sensors and one image processor.

In order to attain the above and other objects, the invention provides an image-reader. The image-reader includes a conveyance unit, a first reading unit, a second reading unit, a storing unit, a process surface determining unit, an acquiring unit, a parameter storing unit, a selecting unit, and an image process executing unit. The conveyance unit is configured to sequentially convey a plurality of document sheets at a predetermined interval along a conveying path, each document sheet including a first surface and a second surface. The first reading unit is configured to generate the first surface worth of first image data by reading a first surface of a document sheet on the conveying path. The second reading unit is configured to generate the second surface worth of second image data by reading a second surface of a document sheet on the conveying path. The storing unit is configured to store the first image data and the second image data. The process surface determining unit is configured to determine which of the first surface and the second surface is a process surface. The acquiring unit is configured to acquire one of at lest part of the first image data and at least part of the second image data corresponding to the process surface from the storing unit. The parameter storing unit is configured to store a first parameter that corresponds to the first surface and a second parameter that corresponds to the second surface. The selecting unit is configured to select one of the first parameter and the second parameter as a process parameter that corresponds to the process surface. The selecting unit outputs the process parameter. The image process executing unit is configured to execute an image process on the one of at least part of the first image data and at least part of the second image data by using the process parameter.

BRIEF DESCRIPTION OF THE DRAWINGS

The particular features and advantages of the invention as well as other objects will become apparent from the following description taken in connection with the accompanying drawings, in which.

DETAILED DESCRIPTION

An image-reader 10 according to an embodiment of the invention will be described while referring to the accompanying drawings.

Structural Descriptions (1) Overall Structure of an Image-Reader

The image-reader 10 of the embodiment constitutes part of a scanner, and a copier.

Figure 1:
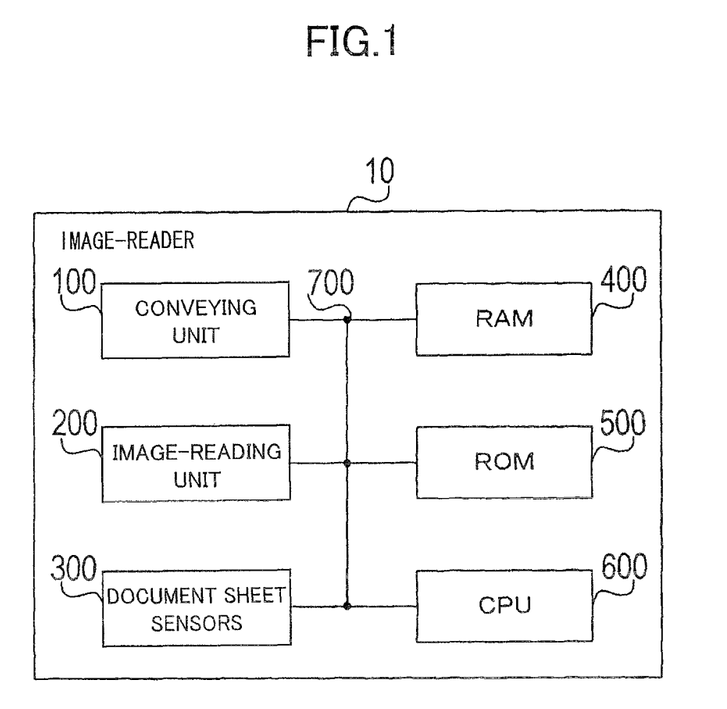
FIG. 1 is a block diagram showing a structure of an image-reader according to an embodiment.

FIG. 1 is a block diagram showing the structure of the image-reader 10. The image-reader 10 includes a conveying unit 100, an image-reading unit 200, document sheet sensors 300, a RAM 400, a ROM 500, and a CPU 600. All of these components are interconnected via an internal bus 700.

The conveying unit 100 is integrally provided with a document sheet cover 30 (see FIG. 2) of the image-reader 10. The conveying unit 100 (the cover 30) functions as an automatic document feeder (ADF) for conveying sheets of a document sheet placed in a feeding tray along a conveying path. The image-reading unit 200 is capable of reading images from both front and back surfaces of a document sheet conveyed along the conveying path. The document sheet sensors 300 detect the document sheet on the conveying path. The RAM 400 and the ROM 500 store various data and programs. The CPU 600 executes various processes based on the programs stored in the ROM 500 to control overall operations of the image-reader 10. The back surface corresponds to a first surface and the front surface corresponds to a second surface.

Figure 2:
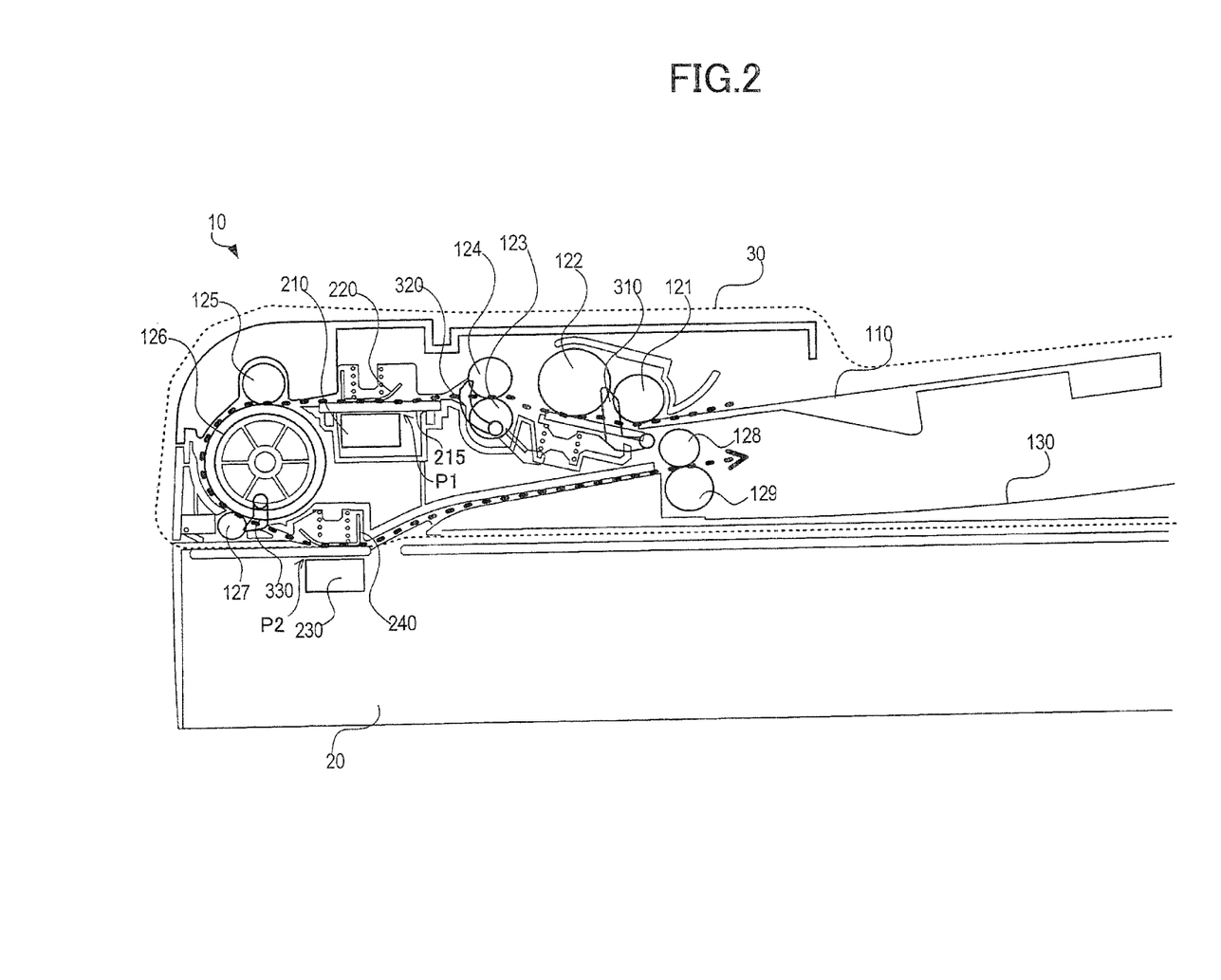
FIG. 2 is an explanatory diagram conceptually illustrating a document sheet cover in a partial cross-sectional view.

FIG. 2 is an explanatory diagram conceptually illustrating the image-reader 10 in a partial cross-sectional view. As shown in FIG. 2, the image-reader 10 has an original support base 20, and the document sheet cover 30. The original support base 20 functions as a flatbed scanner. The cover 30 is attached by hinges (not shown) to the original support base 20. The cover 30 can be rotated open and closed on the original support base 20 via the hinges (not shown).

The conveying unit 100 is built inside the document sheet cover 30. Here, the structure of the document sheet cover 30 will be described in greater detail with reference to the explanatory diagram of FIG. 2.

The document sheet cover 30 includes a feeding tray 110 that holds a document sheet to be read, and a discharge tray 130 for receiving document sheets that have been read. The conveying unit 100 includes conveying rollers 121-129 for conveying the document sheets from the feeding tray 110 to the discharge tray 130 along a conveying path indicated by a bold dotted line in FIG. 2.

The document sheet cover 30 includes a first CIS (contact image sensor) 710, a hack surface pressing piece 220, a second CIS 230, and a front surface of document pressing piece 240. An upstream reading position P1 and a downstream reading position P2 are established on the conveying path. The first CIS 210 is for reading images from the back surface of a document sheet and is disposed at the upstream reading position P1. The back surface of document pressing piece 220 is provided for pressing the document sheet against the reading surface of the first CIS 210 as the document sheet is conveyed through the upstream reading position P1. The second CIS 230 is for reading images from the front surface of a document sheet and is movably disposed on the original support base 20 so as to be movable to the downstream reading position P2. The front surface pressing piece 240 is provided for pressing a document sheet against the reading surface of the second CIS 230 as the document sheet is conveyed through the downstream reading position P2.

An F sensor 310, an RB sensor 320, and an R sensor 330 are provided along the conveying path as the document sheet sensors 300 for detecting the presence of a document sheet being conveyed through the positions of the corresponding sensors.

(2) Structure of the Image-Reading Unit

Figure 3:
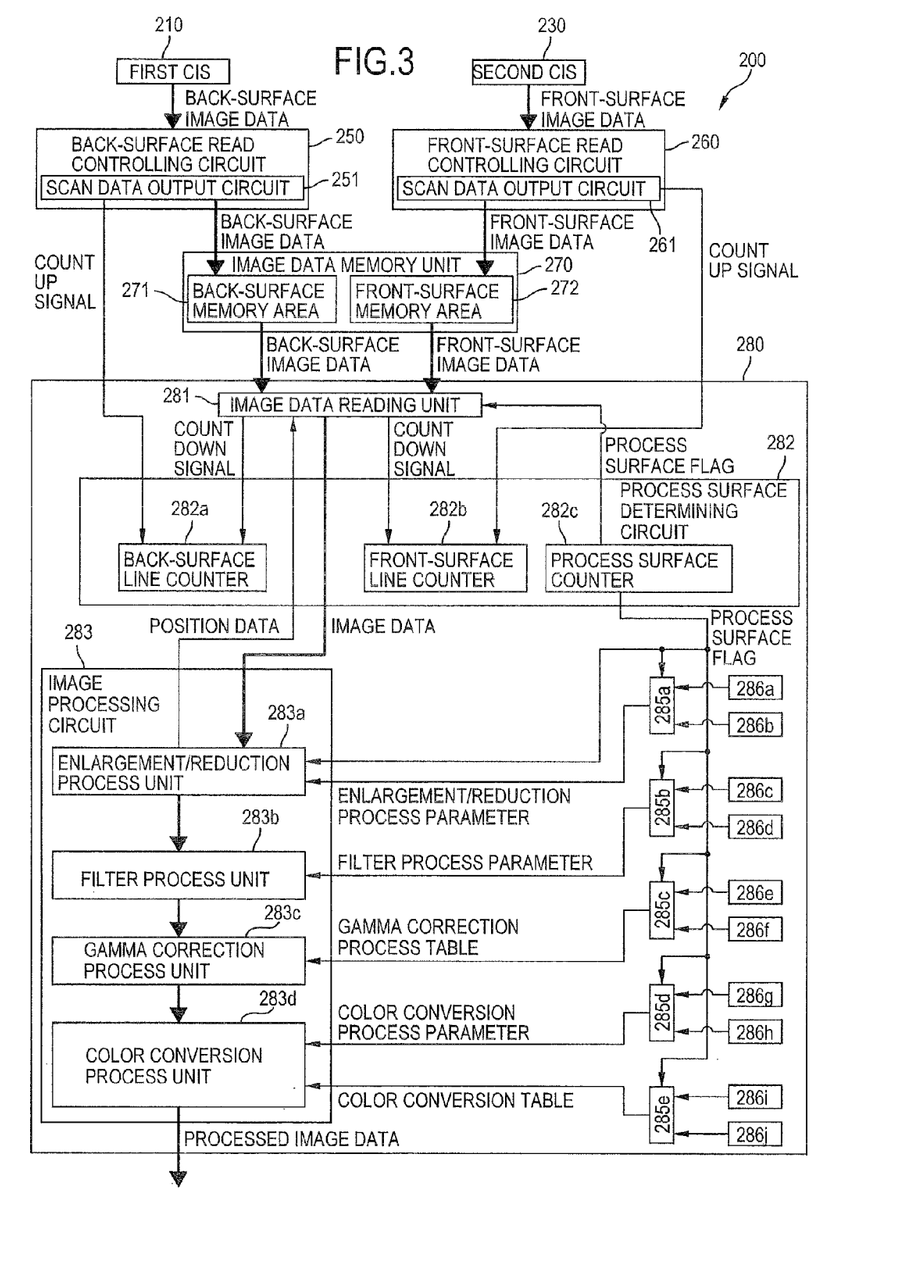
FIG. 3 is a block diagram illustrating a structure of an image-reading unit.

Next, the structure of the image-reading unit 200 provided in the image-reader 10 will be described with reference to the block diagram in FIG. 3.

The image-reading unit 200 includes the first CIS 210, a back-surface read controlling circuit 250, the second CIS 230, a front-surface read controlling circuit 260, an image data memory unit 270, and a digital image-processing circuit 280.

The back-surface read controlling circuit 250 controls the first CIS 210 to scan images from the back surface of a document sheet passing through the upstream reading position P1 and sequentially generates image data in units of lines (in a line basis) extending in a main scanning direction.

The front-surface read controlling circuit 260 controls the second CIS 230 to scan images from the front surface of a document sheet passing through the downstream reading position P2 and sequentially generates image data in units of lines extending in a main scanning direction.

The image data memory unit 270 is configured of a back-surface memory area 271 and a front-surface memory area 272, each of which is configured of a ring buffer. The back-surface memory area 271 stores image data (specifically, a line data set) sequentially generated and written by the back-surface read controlling circuit 250, while the front-surface memory area 272 stores image data (specifically, a line data set) sequentially generated and written by the front-surface read controlling circuit 260. Alternatively, the image data memory unit 270 may be configured as part of the RAM 400 and need not be included in the image-reading unit 200.

The digital image-processing circuit 280 performs processes to read image data in units of lines from either the back-surface memory area 271 or the front-surface memory area 272 and to enlarge or reduce the size of the image represented by this image data. In addition, the digital image-processing circuit 280 performs filtration, gamma correction, color conversion, and other image processes on image data and sequentially outputs the processed image data.

The back-surface read controlling circuit 250 includes a scan data output circuit 251 for writing image data to the back-surface memory area 271 in units of lines after each line of image data (line data set) is generated. The scan data output circuit 251 outputs a count-up signal to a back-surface line counter 282a (described later in greater detail) in the digital image-processing circuit 280 for every line of image data written to the back-surface memory area 271.

Similarly, the front-surface read controlling circuit 260 includes a scan data output circuit 261 for writing image data to the front-surface memory area 272 in units of lines after each line of image data (line data set) is generated. The scan data output circuit 261 outputs a count-up signal to a front-surface line counter 282b (described later in greater detail) in the digital image-processing circuit 280 for every line of image data written to the front-surface memory area 272.

The digital image-processing circuit 280 includes an image data reading unit 281, a process surface determining circuit 282, an image processing circuit 283, selectors 285a-285e, and process parameter storage units 286a-286j storing front-surface/back-surface process parameters or tables for each of various image processes performed by the image processing circuit 283.

The digital-image processing circuit 280 performs image processes on image data of the front surface and image data of the back surface. As described above, the back surface is read by the first CIS 210 and the front surface is read by the second CIS 230. The image quality of the image data of the back surface is generally different from the image quality of the image data of the front surface due to the difference of the sensors (that is, the difference between the first CIS 210 and the second CIS 230). For example, because of difference in optical systems in the first CIS 210 and the second CIS 230, the size of image in the image data of the front surface is different from the size of image in the image data of the back surface.

The image data reading unit 281 reads image data for one line unit (one line data set) from the memory area (either the back-surface memory area 271 or the front-surface memory area 272) corresponding to a "process surface" of the document sheet. The process surface is indicated by a process surface flag outputted from the process surface determining circuit 282. The process surface determining circuit 282 determines the process surface to be the surface of the document sheet corresponding to the next image data to be processed and outputs the process surface flag indicating this process surface.

When outputting one line of image data read from the specified memory area (either the back-surface memory area 271 or the front-surface memory area 272), the image data reading unit 281 advances the line position for the next image data to be read. Specifically, the image data reading unit 281 outputs a count-down signal to the line counter (either a back-surface line counter 282a or a front-surface line counter 282b described later) for the corresponding sheet surface.

The image processing circuit 283 performs a process to enlarge or reduce the image on each surface of the document sheet individually by outputting a line position to the image data reading unit 281 specifying the line of image data to be read from the back-surface memory area 271 or the front-surface memory area 272. The image processing circuit 283 also performs various image processes on image data individually for each surface.

The process surface determining circuit 282 includes a back-surface line counter 282a, a front-surface line counter 282b, and a process surface counter 283c. The back-surface line counter 282a counts lines of the document sheet read by the back-surface read controlling circuit 250. Similarly, the front surface line counter 282b counts lines of the document sheet read by the front-surface read controlling circuit 260.

The process surface counter 282c is used for determining the process surface based on the line number specified by the back-surface line counter 282a and the front-surface line counter 282b. Each time a new process surface is determined (the process surface is changed), the process surface counter 283 outputs the process surface flag to the image data reading unit 281 and the selectors described later, simultaneously.

Upon receiving a count-up signal outputted from the scan data output circuit 251, the back-surface line counter 282a increments the line number. Further, after reading one line worth of image data from the back-surface memory area 271 and outputting this data, the image data reading unit 281 advances the line position for image data to be read next by outputting a count-down signal corresponding to the next line number to the back-surface line counter 282a. Upon receiving this count-down signal, the back-surface line counter 282a calculates the line number of the image data based on the signal. The front-surface line counter 282b has a similar configuration to the back-surface line counter 282a for the front-surface memory area 272.

The image processing circuit 283 includes an enlargement/reduction process unit 283a, a filter process unit 283b, a gamma correction process unit 283c, and a color conversion process unit 283d. The enlargement/reduction process unit 283a performs a process to enlarge or reduce the size of image data on the process surface. The filter process unit 283b performs noise filtration, edge detection, edge enhancement, smoothing, and other filtering processes on the image data. The gamma correction process unit 283c performs a well-known gamma correction process on the image data to set suitable densities. The color conversion process unit 283d performs a well-known color conversion process to change the method of color representation.

More specifically, the enlargement/reduction process unit 283a acquires an enlargement or reduction parameter corresponding to the process surface from an enlargement/reduction process parameter storage unit (286a or 286b) described later. Using this parameter, the enlargement/reduction process unit 283a calculates position data indicating the line position for image data that the image data reading unit 281 will read from the memory unit corresponding to that process surface.

The filter process unit 283b acquires a filter process parameter corresponding to the process surface from a filter process parameter storage unit (286c or 286d) described later. Using this parameter, the filter process unit 283b performs the filter process for the image data of the process surface.

The gamma correction process unit 283c acquires a gamma correction process table corresponding to the process surface from a gamma correction process table storage unit (286e or 286f). The gamma correction process table correlates input values and output values in order to correct densities of image. Using this parameter, the gamma correction process unit 283c performs the gamma correction process for the image data of the process surface.

The color conversion process unit 283d acquires a color conversion process parameter corresponding to the process surface from a color conversion process parameter storage unit (286g or 286h) and acquires a color conversion table from a color conversion table storage unit (286i or 286j). The color conversion table correlates RGB values to CMYK values. The color conversion table may not have all of RGB values or CMYK values (0-255, for example). Intermediate values that are not included in the color conversion table are interpolated by calculation. The color conversion process parameter defines a number of intermediate values that is to be interpolated. Using this parameter and table, the color conversion process unit 283d performs the color conversion process for the image data of the process surface.

As mentioned earlier, the digital image-processing circuit 280 includes process parameter storage units 286a-286j. More specifically, the digital image-processing circuit 280 has the front-surface enlargement/reduction process parameter storage unit 286a, the back-surface enlargement/reduction process parameter storage unit 286b, the front-surface filter process parameter storage unit 286c, the back-surface filter process parameter storage unit 286d, the front-surface gamma correction process table storage unit 286e, the back-surface gamma correction process table storage unit 286f, the front-surface color conversion process parameter storage unit 286g, the back-surface color conversion process parameter storage unit 286h, the front-surface color conversion table storage unit 286i, and the back-surface color conversion table storage unit 286j.

The front-surface enlargement/reduction process parameter storage unit 286a stores a front-surface enlargement/reduction process parameter used to calculate position data for the front surface, while the back-surface enlargement/reduction process parameter storage unit 286b stores a similar back-surface enlargement/reduction process parameter for the back surface.

The front-surface filter process parameter storage unit 286c stores a front-surface filter process parameter used to perform the filter process for the front surface, while the back-surface filter process parameter storage unit 286d stores a similar back-surface filter process parameter for the back surface.

The front-surface gamma correction process table storage unit 286e stores a front-surface gamma correction process table used to perform the gamma correction process for the front surface, while the back-surface gamma correction process table storage unit 286f stores a similar back-surface gamma correction process table for the back surface.

The front-surface color conversion process parameter storage unit 286g stores a front-surface color conversion process parameter used to perform the color conversion process for the front surface, while the back-surface color conversion process parameter storage unit 286h stores a similar back-surface color conversion process parameter for the back surface.

The front-surface color conversion table storage unit 286i stores a front-surface color conversion table used to perform the color conversion process for the front surface, while the back-surface color conversion table storage unit 286j stores a similar back-surface color conversion table for the back surface.

As mentioned earlier, the digital image-processing circuit 280 further includes selectors 285a-285e respectively corresponding to the enlargement/reduction process unit 283a, the filter process unit 283b, the gamma correction process unit 283c, the color conversion process unit 283d. Further, the selectors 285a, 285b, and 285d respectively correspond to the enlargement/reduction process parameter storage units (286*a*, 286*b*), the filter process parameter storage units (286*c*, 286*d*), and color conversion process parameter storage unit (286*g*, 286*h*). The selectors 285*c* and 285*e* also correspond to the gamma correction process table storage unit (286*e*, 286*f* and the color conversion table storage unit (286*i*, 286*j*).

The selectors 285*a*-285*e* select the storage unit corresponding to the process surface indicated by the process surface flag and output a parameter or a table stored in the selected storage unit to the corresponding process unit.

The ROM 500 stores the above described parameters and tables, that is, the enlargement/reduction process parameters, the filter process parameters, the gamma correction process tables, the color conversion process parameters, and the color conversion tables. When starting reading process, the CPU 600 reads the above described parameters and tables and stores the parameters and tables in the corresponding storage units (286*a*-286*j*). The image-reading unit 200 may include a plurality of modes that having different reading settings each other. In this case, the ROM 500 stores parameters and tables for each mode. When performing the reading process, the CPU 600 reads the parameters and tables corresponding to the mode and stores the parameters and tables in the corresponding storage units (286*a*-286*j*).

(3) Structure of the Enlargement/Reduction Process Unit

Figure 4A:
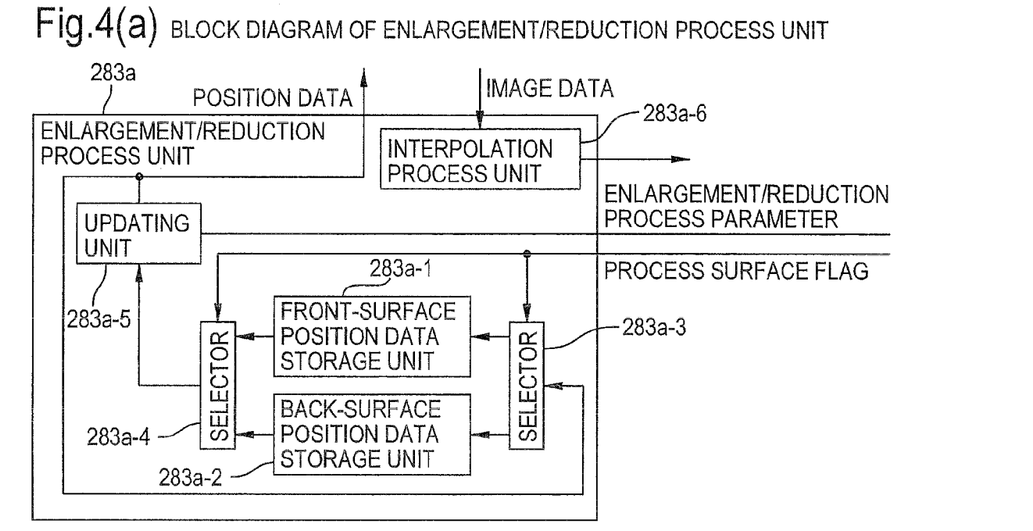
FIG. 4(a) is a block diagram illustrating a structure of an enlargement/reduction process unit.

Next, the structure of the enlargement/reduction process unit 283*a* and the processes for enlarging and reducing an image performed by the enlargement/reduction process unit 283*a* will be described. The enlargement/reduction process unit 283*a* performs a process to enlarge or reduce an image individually for each of the front and back surfaces of a document sheet. In this process, the enlargement/reduction process unit 283*a* individually calculates the position data at which the image data reading unit 281 is to read image data from memory.

As shown in FIG. 4(*a*), the enlargement/reduction process unit 283*a* includes a front-surface position data storage unit 283*a*-1, a back-surface position data storage unit 283*a*-2, selectors 283*a*-3 and 283*a*-4, an updating unit 283*a*-5, and an interpolation process unit 283*a*-6. The front-surface position data storage unit 283*a*-1 stores front-surface position data indicating the reading position for the front surface. The back-surface position data storage unit 283*a*-2 stores back-surface position data indicating the reading position for the back surface. The selectors 283*a*-3 and 283*a*-4 function to select the position data storage unit (283*a*-1 or 283*a*-2) corresponding to the process surface indicated by the process surface flag outputted from the process surface counter 282*c*. The updating unit 283*a*-5 updates position data stored in the position data storage unit (283*a*-1 or 283*a*-2) selected by the selector 283*a*-4 (i.e., the position data storage unit (283*a*-1 or 283*a*-2) corresponding to the process surface) using the enlargement/reduction process parameter corresponding to the process surface that was outputted from the enlargement/reduction process parameter storage unit (286*a* or 286*b*). Subsequently, the updating unit 283*a*-5 outputs the updated position data to the image data reading unit 281 and stores the updated position data in the position data storage unit (283*a*-1 or 283*a*-2) selected by the selector 283*a*-3. The image data reading unit 281 reads the image data corresponding to the position data from the image data memory unit 270 (specifically, 271 or 272) and sends the read image data to the interpolation process unit 286*a*-6.

Next, examples of enlargement and reduction processes executed by the enlargement/reduction process unit 283*a* will be described.

Figure 4B:
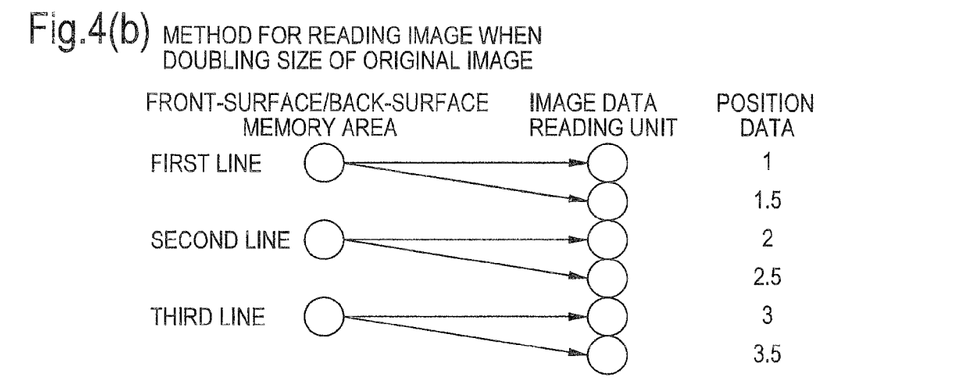
FIG. 4(b) is an explanation diagram illustrating a method of reading image when doubling a size of an original image.

First, a process to double the size of an original image will be described while referring to the explanatory diagram of FIG. 4(*b*). When doubling the size of an original image, the enlargement/reduction process parameter is set to "0.5". Thus the updating unit 283*a*-5 updates the position data by adding "0.5" to the line position indicated in the position data and outputs the updated position data to the image data reading unit 281 (in other words, position data is updated in the sequence 1, 1.5, 2, . . . ). Upon acquiring the position data, the image data reading unit 281 identifies the line position by ignoring any numbers to the right of the decimal in the position data (e.g., the image data reading unit 281 identifies the line position as the first line when the position data is either "1" or "1.5") and reads image data for the line (line data set) specified by the line position from the identified line position. Accordingly, the image data reading unit 281 will read the same line twice, while outputting the image data to the interpolation unit 286*a*-6. The image data reading unit 281 outputs a count-down signal when image data is outputted. Here, in the enlargement case where the same image data for the line specified by the line position is read a plurality of times (two times in this example), the image data reading unit 281 outputs a count-down signal only after the same image data for the line specified by the line position is read the plurality of times (two times), to maintain consistency with the value indicated by the line counter. The interpolation unit 286*a*-6 doubles the size of the original image in the acquired image data (that is, one line image) in the main scanning direction that is parallel to the line.

The interpolation unit 286*a*-6 also performs various image processes on image data for the same line acquired twice in this way, and sequentially outputs the resulting data. When combining the lines outputted above, the digital image-processing circuit 280 generates image data for an image enlarged to twice the size of the original.

Figure 4C:
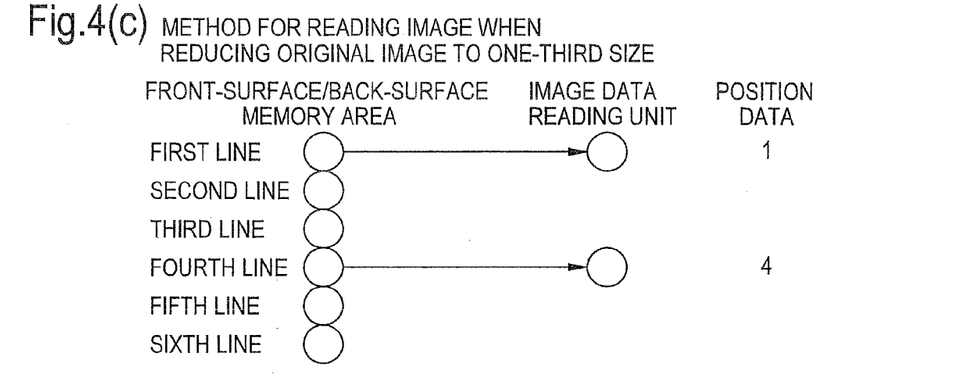
FIG. 4(c) is an explanation diagram illustrating a method of reading image when reducing the original image to one-third size.

Next, an example for a process to reduce the original image to one-third the original size will be described while referring to the explanatory diagram in FIG. 4(*c*). When reducing an original image to one-third the size, the enlargement/reduction process parameter is set to "3". The updating unit 283*a*-5 then updates position data by adding "3" to the line position indicated in the position data and outputs the updated position data to the image data reading unit 281 (in other words, position data is updated in the sequence 1, 4, 7, . . . ). Upon acquiring the position data, the image data reading unit 281 reads image data for the line position indicated in the position data. Accordingly, the image data reading unit 281 reads image data for the indicated lines while skipping lines at a rate corresponding to the reduction ratio, and subsequently outputs the image data to the interpolation unit 286*a*-6. When skipping lines in this process, the image data reading unit 281 outputs a count-down signal equivalent to the number of skipped lines in order to maintain consistency with the value indicated by the line counter. The interpolation unit 286*a*-6 reduces the original image in the acquired image data (that is, one line image) to one-third in the main scanning.

The interpolation unit 286*a*-6 also performs the various image processes on image data acquired for one line unit and sequentially outputs the processed data. When the lines of image data outputted in this way are combined, the digital image-processing circuit 280 generates image data for an image reduced to one-third the original size.

In the embodiment, an individual enlargement/reduction process parameter is provided for each surface of the document sheet, and position data corresponding to each surface of a sheet is updated individually based on the corresponding parameter. Hence, this process can set an individual magnification ratio for each surface.

The digital image-processing circuit 280 may be configured to execute one process cycle satisfying the following condition:

(time interval for one process cycle)×(maximum enragement ratio)×2=(time interval for reading lines by CIS).

Here, one process cycle includes the process for reading image data of a prescribed number of lines from a memory area (271 or 272), the image process, and the process outputting the result by the digital image-processing circuit 280 for the line data set. The "maximum enlargement ratio" is a maximum ratio that the image-reader 10 can set in the enlargement and reduction processes. The "time interval for reading lines by CIS" is a time interval for reading the image for one line by the read controlling circuit (250 or 260) with the CIS (210, 230), for generating image data by the read controlling circuit (250 or 260), and for writing the image data in the memory area (271 or 272). In other words, the digital image-processing circuit 280 executes one process cycle, from reading image data of a line from a memory area to perform image processing and outputting the result, at a speed equivalent to twice the maximum enlargement ratio relative to the process in which each read controlling circuit reads an image for one line with the CIS, generates image data for one line, and writes the image data for one line to the image data memory unit 270.

Further, in cases such as when the digital image-processing circuit 280 cannot achieve sufficient processing speed, delays in the process may generate an insufficient memory error, but the read controlling circuit may perform a process for preventing such errors from occurring. That is, when the line number indicated by the line counter (282a or 282b) exceeds a prescribed number, the read controlling circuit (250 or 260) may temporarily halt the reading of image data while also stopping the conveying unit 100 from conveying the original. The read controlling circuit (250 or 260) can resume the reading of image data after processing by the digital image-processing circuit 280 has progressed and the line number indicated by the line counter (282a or 282b) has sufficiently decreased. Further, when the line number indicated by the line counter (282a or 282b) exceeds the prescribed number, the read controlling circuit (250 or 260) may reduce the speed at which the document sheet is conveyed and reduce the speed at which the image data is read. The read controlling circuit (250 or 260) may subsequently restore the conveying speed for the document sheet after processing by the digital image-processing circuit 280 has progressed and the line number indicated by the line counter (282a or 282b) has decreased sufficiently.

Description of Operations

Next, a duplex reading process executed by the image-reader 10 will be described with reference to the flowchart in FIG. 5. The image-reader 10 begins the duplex reading process upon receiving a scan instruction from the user through input on an operating unit (not shown). Through this process, the image-reader 10 sequentially feeds the document sheets set in the feeding tray 110 and automatically conveys the document sheets while scanning both the front and back surfaces thereof.

Figure 5:
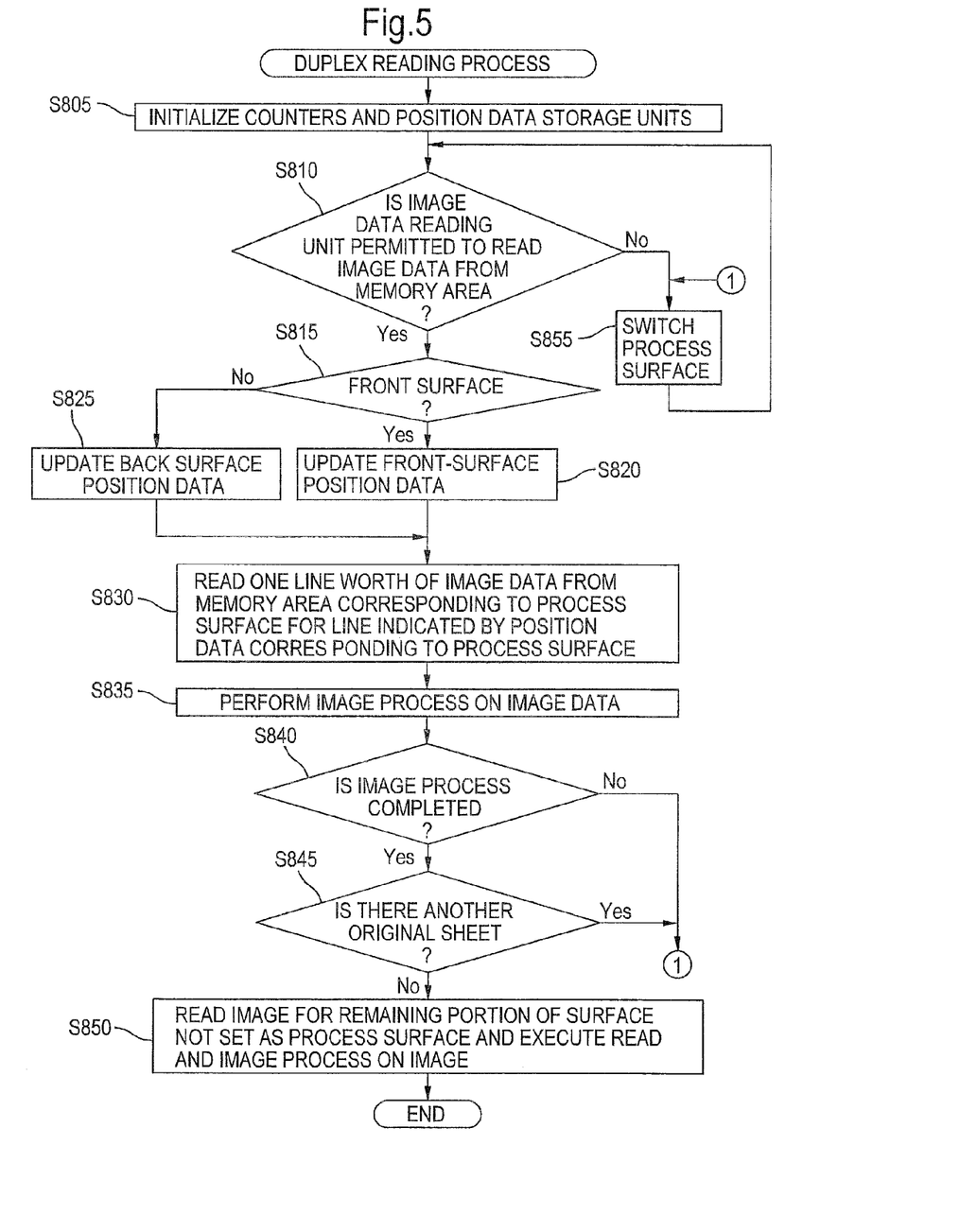
FIG. 5 is a flowchart illustrating a duplex reading process.

In S805 of FIG. 5, the conveying unit 100 begins conveying a sheet of the original, after which the first CIS 210 begins scanning an image from the back surface of the document sheet as the document sheet passes through the upstream reading position on the conveying path. Next, the back-surface read controlling circuit 250 sequentially writes image data generated in units of lines to the back-surface memory area 271. Similarly, the second CIS 230 begins scanning the front surface of the sheet as the sheet passes through the downstream reading position along the conveying path. Next, the front-surface read controlling circuit 260 sequentially writes image data generated in units of lines to the front-surface memory area 272. Consequently, the image-reader 10 scans images from the back surface of the document sheet while the leading edge of the sheet is positioned between the upstream reading position P1 and the downstream reading position P2, scans images in parallel from the front surface and back surface of the document sheet after the leading edge reaches the downstream reading position and until the trailing edge passes the upstream reading position, and scans images from the back surface of the document sheet after the trailing edge of the document sheet passes the upstream reading position P1 and until the trailing edge reaches the downstream reading position P2. Further, when the conveying unit 100 begins conveying the document sheet, the process surface determining circuit 282 initializes the process surface counter 282c, sets the process surface flag to the back surface, and initializes the back-surface line counter 282a and the front-surface line counter 282b. The enlargement/reduction process unit 283a in the image processing circuit 283 also initializes the front-surface position data storage unit 283a-1 and the back-surface position data storage unit 283a-2.

In S810 the process surface determining circuit 282 determines whether to permit the image data reading unit 281 to read the image data of the process surface indicated by the process surface flag from the memory area (271 or 272). For example, the process surface determining circuit 282 may determine to read the image data of the process surface from the memory area (271 or 272) when the number of lines indicated by the line counter (282a or 282b) corresponding to this process surface is at least a predetermined number, or when the number of lines indicated by the line counter (282a or 282b) corresponding to the process surface is at least a predetermined number and is greater than or equal to the number of lines indicated by the other line counter. The process advances to S815 when a positive determination is made (S810: YES). The process advances to S855 when a negative determination is made (S810: NO).

In S815 the enlargement/reduction process unit 283a determines whether the process surface indicated by the process surface flag is a front surface. When a positive determination is made (S815: YES), the process advances to S820. When a negative determination is made (S815: NO), the process advances to S825.

In S820 the updating unit 283a-5 of the enlargement/reduction process unit 283a updates the front-surface position data stored in the front-surface position data storage unit 283a-1. More specifically, the updating unit 283a-5 adds the front-surface enlargement/reduction process parameter outputted from the front-surface enlargement/reduction process parameter storage unit 286a to the front-surface position data and stores this updated front-surface position data in the front-surface position data storage unit 283a-1. The updating unit 283a-5 also outputs the updated front-surface position data to the image data reading unit 281. Subsequently, the process advances to S830.

In S825 the updating unit 283a-5 updates the back surface position data stored in the back-surface position data storage unit 283a-2, similarly to S820. The updating unit 283a-5 also outputs the updated back-surface position data to the image data reading unit 281. Subsequently, the process advances to S830.

In S830 the image data reading unit 281 reads one line worth of image data (a set of line data) from the memory area (271 or 272) corresponding to the process surface for the line indicated by the position data corresponding to the process surface and outputs this image data to the image processing circuit 283.

In S835 the line worth of image data received by the image processing circuit 283 is outputted after passing through the enlargement/reduction process unit 283a, the filter process unit 283b, the gamma correction process unit 283c, and the color conversion process unit 283d. At this time, the image data is subjected to a filtering process in the filter process unit 283b, a gamma correction process in the gamma correction process unit 283c, and a color conversion process in the color conversion process unit 283d, and the resulting image data is outputted from the image processing circuit 283.

In S840 the process surface determining circuit 282 determines whether image processing has been completed for the entire process surface. Specifically, by a well-known method of detecting the size of the sheet conveyed on the conveying path using the F sensor 310 and the RB sensor 320 to determine the total number of lines to be read on the back or front surface of the sheet. Then, the process surface determining circuit 282 can determine whether image processing has been completed for the process surface based on whether the number of lines processed on the surface has reached the total number of lines determined above. The process advances to S845 when the process surface determining circuit 282 reaches a positive determination (S840: YES) and advances to S855 when the process surface determining circuit 282 reaches a negative determination (S840: NO).

In S845 the process surface determining circuit 282 determines whether there is another document sheet to be scanned next to the currently scanned document sheet, by using the F sensor 310 and the RB sensor 320. The process advances to S855 when a positive determination is made (S845: YES). The process advances to S850 when a negative determination is made (S845: NO).

In S850 the digital image-processing circuit 280 reads the image for the remaining portion of the surface not set as the process surface and executes the read process and image processes on this image. Once these processes are completed, the current duplex reading process of FIG. 5 is completed.

In S855 the process surface counter 282c switches the process surface indicated by the process surface flag to the opposite surface, and the process returns to S810. In other words, in S855, the process surface determining circuit 282 determines the candidate process surface, and subsequently in S810 determines whether the candidate process surface is the true process surface whose image data is to be read by the image data reading unit 281.

Effects of the Embodiment

With the image-reader 10 according to the embodiment, the digital image-processing circuit 280, and not the CPU 600, determines which surface of the document sheet is targeted for image processing and selects the image process parameter to be used in the image process for each surface. Accordingly, the single image-processing circuit 280 can be used to quickly process images on both surfaces of a sheet scanned in parallel by two CISs 210 and 230.

Variations of the Embodiment

While the invention has been described in detail with reference to the embodiments thereof, it would be apparent to those skilled in the art that various changes and modifications may be made therein without departing from the spirit of the invention.

For example, in the embodiment described above, the image data reading unit 281 reads image data from the image data memory unit 270 one line at a time. However, the image data reading unit 281 may instead read image data for a plurality of lines, and the enlargement/reduction process unit 283a may update the position data based on the number of lines that are read at one time. This method will obtain the same effects described in the embodiment.

At least one of the first CIS 210 and the second CIS 230 may be a CCD (charge coupled device) sensor.

At least one of the storage units 286a-286j may store a plurality of parameters or tables.

What is claimed is:

1. An image-reader comprising:
   a conveyance unit that is configured to sequentially convey a plurality of document sheets at a predetermined interval along a conveying path, each document sheet including a first surface and a second surface;
   a first reading unit that is configured to generate the first surface worth of first image data by reading a first surface of a document sheet on the conveying path;
   a second reading unit that is configured to generate the second surface worth of second image data by reading a second surface of a document sheet on the conveying path;
   a storing unit that is configured to store the first image data and the second image data;
   a process surface determining unit that is configured to determine which of the first surface and the second surface is a process surface;
   an acquiring unit that is configured to acquire one of at least part of the first image data and at least part of the second image data, the acquired one corresponding to the process surface from the storing unit;
   a parameter storing unit that is configured to store a first parameter that corresponds to the first surface and a second parameter that corresponds to the second surface;
   a selecting unit that is configured to select one of the first parameter and the second parameter as a process parameter that corresponds to the process surface, the selecting unit outputting the process parameter; and
   an image process executing unit that is configured to execute an image process on the one of at least part of the first image data and at least part of the second image data by using the process parameter,
   wherein the image process executing unit includes a plurality of process units executing a plurality of image processes different from each other,
   wherein the selecting unit includes a plurality of selectors having one-to-one correspondence with the plurality of process units,
   wherein the parameter storing unit stores a plurality of first parameters having one-to-one correspondence with the plurality of selectors and stores a plurality of second parameters having one-to-one correspondence with the plurality of selectors,
   wherein each selector selects one of the corresponding first parameter and the corresponding second parameter as a process parameter and outputs the process parameter to a process unit corresponding to the selector.

2. An image-reader comprising:
   a conveyance unit that is configured to sequentially convey a plurality of document sheets at a predetermined interval along a conveying path, each document sheet including a first surface and a second surface;

a first reading unit that is configured to generate the first surface worth of first image data by reading a first surface of a document sheet on the conveying path;

a second reading unit that is configured to generate the second surface worth of second image data by reading a second surface of a document sheet on the conveying path;

a storing unit that is configured to store the first image data and the second image data;

a process surface determining unit that is configured to determine which of the first surface and the second surface is a process surface;

an acquiring unit that is configured to acquire one of at least part of the first image data and at least part of the second image data, the acquired one corresponding to the process surface from the storing unit;

a parameter storing unit that is configured to store a first parameter that corresponds to the first surface and a second parameter that corresponds to the second surface;

a selecting unit that is configured to select one of the first parameter and the second parameter as a process parameter that corresponds to the process surface, the selecting unit outputting the process parameter; and an image process executing unit that is configured to execute an image process on the one of at least part of the first image data and at least part of the second image data by using the process parameter, wherein the first image data includes a plurality of sets of first line data and the second image data includes a plurality of sets of second line data, wherein the first reading unit generates each set of first line data by reading one line of the first surface, wherein the second reading unit generates each set of second line data by reading one line of the second surface, wherein the acquiring unit acquires one of a set of first line data and a set of second line data, the acquired one corresponding to the process surface from the storing unit, wherein the process surface determining unit specifies first number of sets of first line data that the acquiring unit has not acquired from the storing unit and second number of sets of second line data that the acquiring unit has not acquired from the storing unit, the process surface determining unit determining the process surface based on the first number and the second number.

3. The image-reader according to claim 2, wherein when the image process executing unit finishes executing the image process on the one of a set of first line data and a set of second line data, the one corresponding to the process surface, the process surface determining unit changes the process surface that has been set to the other surface, and determines whether one of the first number and the second number corresponding to the changed process surface is greater than a prescribed number.

4. The image-reader according to claim 2, wherein the process determining unit determines one of the first surface and the second surface as a candidate surface, wherein the process surface determining unit determines that the candidate surface is the process surface when the candidate surface is the first surface and when the first number is greater than or equal to the second number, wherein the process surface determining unit determines that the candidate surface is the process surface when the candidate surface is the second surface and when the second number is greater than or equal to the first number.

5. The image-reader according to claim 2, wherein the parameter storing unit stores a first resize parameter as a first parameter and a second resize parameter as a second parameter, wherein the image-reader includes:

a first position storing portion that is configured to store first position information specifying a position of line of the first surface, the acquiring unit acquiring the set of first line data based on the line specified by the first position information; and a second position storing portion that is configured to store second position information specifying a position of line of the second surface, the acquiring unit acquiring the set of second line data based on the line specified by the second position information;

wherein the first position is updated based on the first resize parameter when the first surface is the process surface and when the acquiring portion acquires the set of the first line data, wherein the second position is updated based on the second resize parameter when the second surface is the process surface and when the acquiring portion acquires the set of the second line data.

6. An image-reader comprising:

a conveyance unit that is configured to sequentially convey a plurality of document sheets at a predetermined interval along a conveying path, each document sheet including a first surface and a second surface;

a first reading unit that is configured to generate the first surface worth of first image data by reading a first surface of a document sheet on the conveying path;

a second reading unit that is configured to generate the second surface worth of second image data by reading a second surface of a document sheet on the conveying path;

a storing unit that is configured to store the first image data and the second image data;

a process surface determining unit that is configured to determine which of the first surface and the second surface is a process surface;

an acquiring unit that is configured to acquire one of at least part of the first image data and at least part of the second image data, the acquired one corresponding to the process surface from the storing unit;

a parameter storing unit that is configured to store a first parameter that corresponds to the first surface and a second parameter that corresponds to the second surface;

a selecting unit that is configured to select one of the first parameter and the second parameter as a process parameter that corresponds to the process surface, the selecting unit outputting the process parameter; and an image process executing unit that is configured to execute an image process on the one of at least part of the first image data and at least part of the second image data by using the process parameter, wherein the process surface determining unit sets the process surface to one of the first surface and the second surface and determines whether first number of first-lines in one of the first line data and the second line data is greater than a prescribed number, the one of the first line data and the second line data being stored in the storing unit and corresponding to the process surface, the first-lines in the one of the first line data and the second line data having not been acquired by the acquiring unit, wherein when the process surface determining unit determines that the first number is not greater than the prescribed number, the process surface determining unit changes the process surface to another one of the first surface and the second surface, and determines whether second number of second-lines in another one of the first line data and the second line data is greater than the prescribed number, the another one of the first line data and the second line data being stored in the storing unit and corresponding to the process surface, the second-lines in the another one of the first line data and the second line data having not been acquired by the acquiring unit, wherein the process surface determining unit determines that the first number of first-lines is greater than the prescribed number, the acquiring unit acquires one of at least part of the first image data and at least part of the second image data, the acquired one corresponding to the process surface from the storing unit, and the image process executing unit executes the image process on the acquired one of the at least part of the first image data and the at least part of the second image data by using the process parameter corresponding to the process surface, wherein the process surface determining unit determines that the second number of second-lines is greater than the prescribed number, the acquiring unit acquires one of at least part of the first image data and at least part of the second image data, the acquired one corresponding to the process surface from the storing unit, and the image process executing unit executes the image process on the acquired one of the at least part of the first image data and the at least part of the second image data by using the process parameter corresponding to the process surface.

* * * * *